(12) United States Patent
Miyazaki et al.

(10) Patent No.: US 10,585,251 B2
(45) Date of Patent: Mar. 10, 2020

(54) OPTICAL MODULATOR AND OPTICAL TRANSMISSION DEVICE USING THE SAME

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 16/231,608

(22) Filed: Dec. 24, 2018

(65) Prior Publication Data

US 2019/0204515 A1 Jul. 4, 2019

(30) Foreign Application Priority Data

Dec. 28, 2017 (JP) ................................ 2017-253505

(51) Int. Cl.
*G02B 6/42* (2006.01)
*G02F 1/225* (2006.01)
(Continued)

(52) U.S. Cl.
CPC .......... *G02B 6/4266* (2013.01); *G02B 6/241* (2013.01); *G02B 6/4256* (2013.01);
(Continued)

(58) Field of Classification Search
CPC .... G02B 6/4266; G02B 6/241; G02B 6/4256; G02F 1/2255; G02F 1/2257; G02F 2001/212
(Continued)

(56) References Cited

U.S. PATENT DOCUMENTS

2005/0214957 A1* 9/2005 Kihara ................. G02B 6/4201
438/14
2015/0063809 A1* 3/2015 Sugiyama ............... H04J 14/06
398/65
(Continued)

FOREIGN PATENT DOCUMENTS

| JP | 2014199302 | 10/2014 |
| JP | 2015069162 | 4/2015 |
| JP | 2017134241 | 8/2017 |

*Primary Examiner* — Jerry M Blevins
(74) *Attorney, Agent, or Firm* — JCIPRNET

(57) ABSTRACT

An optical modulator and an optical transmission device using the same are provided. The optical modulator includes an optical waveguide substrate where an optical waveguide is formed; a light modulation element, provided in the optical waveguide substrate and including a modulation electrode applying an electric field corresponding to a modulation signal to the optical waveguide; a terminal substrate, disposed near the light modulation element and including terminal resistors that terminate the modulation signal, wherein the optical waveguide substrate, the light modulation element and the terminal substrate are accommodated in a housing; and a heat dissipation auxiliary element, provided between the terminal resistors and the housing. A distance b between the terminal resistors and the heat dissipation element is set to be shorter than a distance a from the terminal resistors to an end on the side of the optical waveguide substrate of the terminal substrate.

12 Claims, 4 Drawing Sheets

(51) Int. Cl.
*G02B 6/24* (2006.01)
*G02F 1/21* (2006.01)
*G02B 6/12* (2006.01)

(52) U.S. Cl.
CPC .......... *G02F 1/2255* (2013.01); *G02F 1/2257* (2013.01); *G02B 2006/12142* (2013.01); *G02F 2001/212* (2013.01)

(58) Field of Classification Search
USPC .......................................................... 385/92
See application file for complete search history.

(56) References Cited

U.S. PATENT DOCUMENTS

| | | | | |
|---|---|---|---|---|
| 2015/0340575 | A1* | 11/2015 | Nakabayashi | ........ H01L 33/486 257/91 |
| 2017/0238446 | A1* | 8/2017 | Wu | ..................... H01L 23/3675 257/712 |

\* cited by examiner

OPTICAL MODULATOR AND OPTICAL TRANSMISSION DEVICE USING THE SAME

This application claims the priority of Japan patent application serial no. 2017-253505, filed on Dec. 28, 2017. The entirety of the above-mentioned patent application is hereby incorporated by reference herein and made a part of this specification.

BACKGROUND

Technical Field

The disclosure relates to an optical modulator and an optical transmission device using the same, and particularly, to an optical modulator in which a light modulation element and a terminal substrate disposed in the vicinity of the light modulation element are accommodated in a housing, and an optical transmission device using the same.

Description of Related Art

In recent years, in high speed/large capacity optical fiber communication systems, optical modulators using a substrate in which an optical waveguide is formed and optical transmission devices into which such an optical modulator is incorporated have been widely used. With regard to these, an optical modulator in which $LiNbO_3$ (referred to as "LN") having an electrooptic effect is used for a substrate has advantages over a modulator made of a semiconductor material such as InP, Si, and GaAs and is widely used for a high speed/large capacity optical fiber communication system. An optical modulator using this LN includes an optical waveguide that confines light in an LN substrate and guides it, and additionally, a control electrode that applies an electric field to the optical waveguide is formed. In addition, the control electrode includes an RF electrode (signal electrode) that applies a high frequency signal and a DC bias electrode that applies a low frequency signal and a DC bias voltage.

In recent years, due to the trend of increasing transmission capacity, a modulation method of an optical modulator for a high speed/large capacity optical fiber communication system has changed from conventional intensity modulation (on-off keying) and the like and multi-level modulation such as quadrature phase shift keying (QPSK) and dual polarization-quadrature phase shift keying (DP-QPSK) using phase modulation and a transmission format in which polarization multiplexing is used in multi-level modulation have become mainstream. In addition, a method in which a plurality of DP-QPSK chips for multiple elements are used and a transmission capacity is further increased has been proposed (for example, refer to Patent Document 1: Japanese Patent Laid Open No. 2015-69162).

As shown in FIG. 1, in a DP-QPSK optical modulator, an optical waveguide 2 in which two nested optical waveguides constituted by two Mach-Zehnder type optical waveguides are disposed is formed on a substrate (optical waveguide substrate) 1 of LN or the like. In addition, in order to apply a high frequency signal to a modulation unit constituted by Mach-Zehnder type optical waveguides, a plurality of signal electrodes (not shown) are provided on the substrate 1. The modulation signals are inputted to the signal electrodes through an input connector 4. In addition, terminal resistors 70 are connected to terminals of the signal electrode. When terminal resistors 70 are disposed corresponding to signal electrodes, as shown in FIG. 1, a plurality of terminal resistors 70 are provided on the same terminal substrate 7, and the size of the optical modulator may be reduced. The substrate (optical waveguide substrate) 1 of LN or the like and the terminal substrate 7 are disposed in a housing 9 and packaged.

In order for the optical modulator to operate at a high speed, a configuration of a traveling wave type electrode that input electrical signals propagate through the signal electrodes is used. A signal frequency inputted to the signal electrodes is a high frequency signal in a microwave band, and almost all of the input electric energy is consumed in the terminal resistors 70 except for loss during propagation through the signal electrodes and converted into heat there.

DP-QPSK includes four modulation units. In order to support a phase modulation method in this configuration, driving is performed at a voltage amplitude twice (4 times in the case of power) that of an intensity modulation method using a single modulator structure in the related art. Therefore, the power consumed in the modulator is 16 times or more that of a modulator using a single modulator structure in the related art. However, in order to cope with the demand for reducing the size of an optical modulator, it is necessary for the terminal substrate 7 to be disposed in the vicinity of the optical waveguide substrate 1, and heat generated in the terminal substrate is a significant problem.

In addition, in the case of a multi-element configuration which two or more DP-QPSK modulator configurations are incorporated into the same housing and a transmission capacity increases, an amount of heat is 32 times or more an amount of heat generated in an intensity modulation method using a single modulator structure in the related art. Heat generated in the terminal substrate causes deterioration in temperature drift in the optical modulator. In addition, heat generated in the terminal resistor itself is a cause of deterioration, cracking and separation of the terminal resistors over time, and causes serious problems such as deterioration of the reliability of the optical modulator and an optical transmission device using the same.

The influence of heat generated in the terminal substrate is inherent in most optical modulators having a traveling wave type electrode configuration. However, in the related art, these problems have not been studied yet and countermeasures have not been taken. Rather, the influence of heat generated becomes lost in change in temperature of an environment in which an optical modulator is placed and instability of the optical modulator and is treated as a problem of deterioration of characteristics such as temperature drift in an optical modulator in the related art.

However, regarding this influence, the influence is particularly large in an optical modulator having a DP-QPSK configuration, in which (a) amplitudes of input electrical signals are large, (b) a plurality of terminal resistors is included, (c) the terminal resistors are provided on the same substrate, and the like, and the problem has become more serious. Furthermore, the influence becomes more serious due to that the optical modulator has (d) a small size, and (e) a plurality of elements (multi-element configuration).

As a countermeasure for addressing a problem of heat generated in such terminal resistors, as shown in Patent Document 2 (Japanese Patent Laid Open No. 2014-199302), increasing an area of the terminal resistors and providing heat conduction holes at a terminal substrate have been proposed. However, in such a configuration and method, the size of the terminal substrate itself increases, and production costs also increase, and suitable applications are thus limited. Therefore, a solution that can be applied in various transmission formats and satisfies requirements for a small size and low costs is desired. In addition, there is a demand for an optical transmission device which has high reliability and reduced temperature drift due to mounting an optical modulator to which countermeasures for heat generated are applied.

In addition, Patent Document 3 (Japanese Patent Laid Open No. 2017-134241) proposes a method of reducing an amount of heat transferred from a terminal substrate to an optical waveguide substrate in order to reduce an influence of heat generated in the terminal substrate on the optical waveguide substrate. However, there has been an increasing need for further reducing the size of the optical modulator and reducing an influence of heat generated in the terminal substrate and further improvement is expected.

As described above, the disclosure is to provide an optical modulator that reduces an influence of heat generated in terminal resistors and an optical transmission device using the same. In particular, like a DP-QPSK optical modulator, in an optical modulator including a plurality of signal inputs and a plurality of terminal resistors, it is possible to reduce the amount of heat generated in the terminal resistors more significantly. In addition, there are provided an optical modulator that efficiently reduces heat conduction to an optical waveguide substrate and an optical transmission device using the same.

SUMMARY

In view of the above, an optical modulator of the disclosure and an optical transmission device using the same are provided.

(1) The optical modulator includes an optical waveguide substrate where an optical waveguide is formed; a light modulation element that is provided in the optical waveguide substrate and includes a modulation electrode that applies an electric field corresponding to a modulation signal to the optical waveguide; a terminal substrate that is disposed in the vicinity of the light modulation element and includes terminal resistors that terminate the modulation signal, in which the optical waveguide substrate, the light modulation element and the terminal substrate are accommodated in a housing; and a heat dissipation auxiliary element is provided between the terminal resistor and the housing. A distance between the terminal resistors and the heat dissipation auxiliary unit is set to be shorter than a distance from the terminal resistors to an end on the side of the optical waveguide substrate of the terminal substrate, or a distance from the terminal resistors to an end on the side opposite to the optical waveguide substrate of the terminal substrate is set to be shorter than a distance from the terminal resistors to an end on the side of the optical waveguide substrate of the terminal substrate.

DESCRIPTION OF THE EMBODIMENTS

Figure 1:
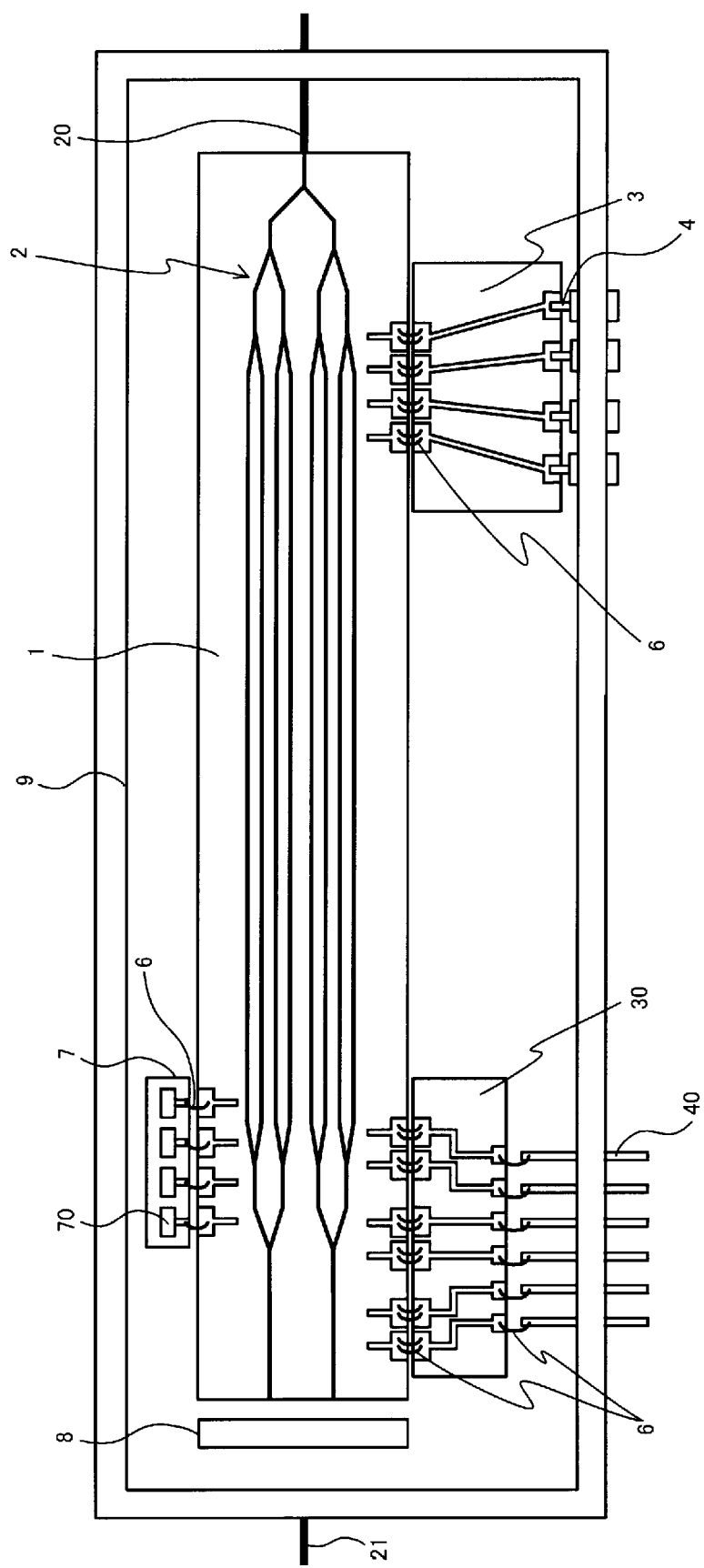
FIG. 1 is a plan view showing an example of a DP-QPSK optical modulator of the related art.
Figure 2:
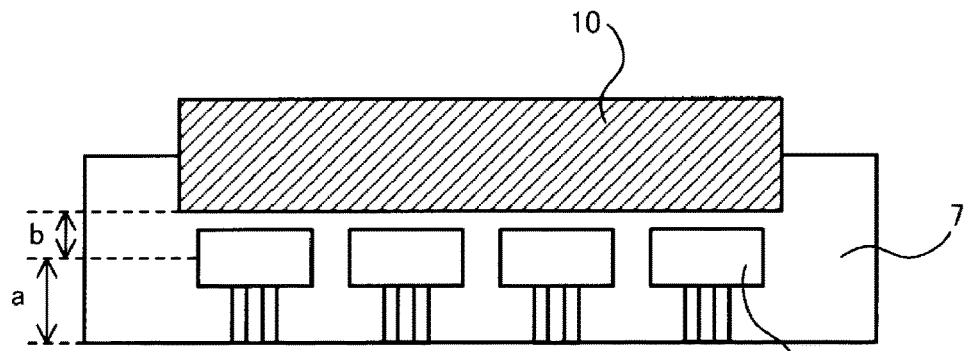
FIG. 2 is a plan view showing the first embodiment of an optical modulator according to the disclosure.
Figure 3:
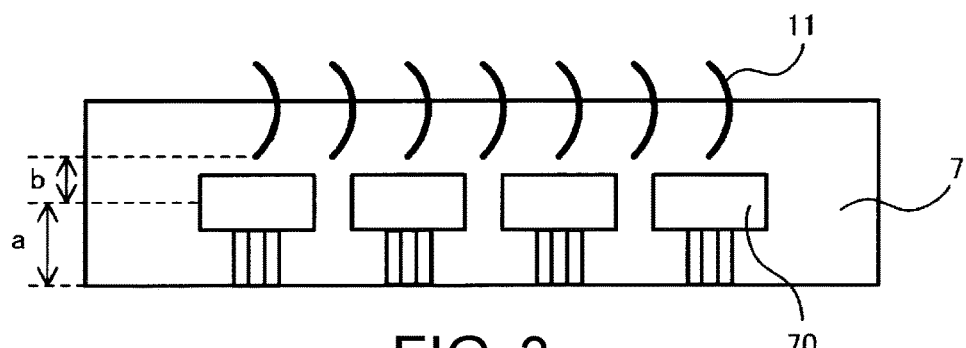
FIG. 3 is a plan view showing the second embodiment of the optical modulator according to the disclosure.
Figure 4:
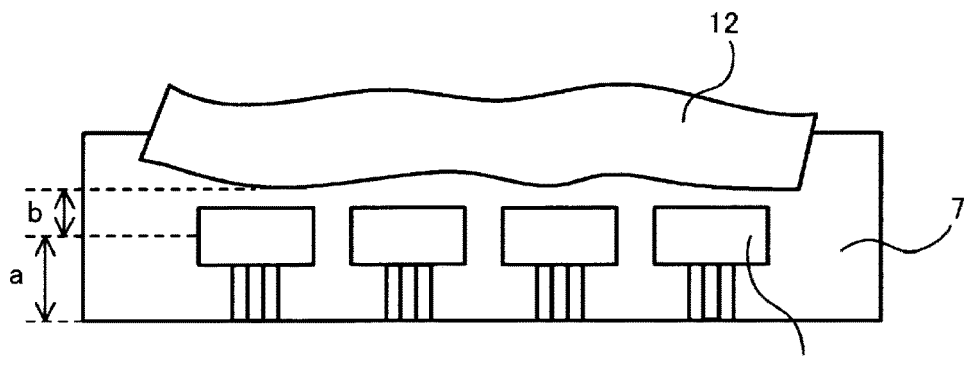
FIG. 4 is a plan view showing the third embodiment of the optical modulator according to the disclosure.

Optical modulators according to the disclosure will be described below in detail with reference to FIGS. 2 to 10. FIGS. 2 to 8 are plan views of a terminal substrate. In the disclosure, an optical modulator includes an optical waveguide substrate 1 where an optical waveguide 2 is formed; a light modulation element that is provided in the optical waveguide substrate 1 and includes a modulation electrode that applies an electric field corresponding to a modulation signal to the optical waveguide 2; and a terminal substrate 7 that is disposed in the vicinity of the light modulation element and includes terminal resistors 70 that terminates the modulation signal, which are accommodated in a housing 9. As shown in FIGS. 2 to 7, heat dissipation auxiliary elements 10 to 13 are provided between the terminal resistors 70 and the housing 9, a distance b between the terminal resistors 70 and the heat dissipation auxiliary element 10 (or 11~13) is set to be shorter than a distance a that is from the terminal resistors 70 to an end on the side of the optical waveguide substrate 1 of the terminal substrate 7, or as shown in FIG. 8, a distance b from the terminal resistors 70 to an end on the side opposite to the optical waveguide substrate 1 of the terminal substrate 7 is set to be shorter than a distance a from the terminal resistors 70 to an end on the side of the optical waveguide substrate 1 of the terminal substrate 7.

As the optical modulator of the disclosure, for example, a DP-QPSK optical modulator shown in FIG. 1 or the like can be used. As an optical waveguide substrate 1, there are optical waveguide substrates using a dielectric of $LiNbO_3$, $LiTaO_3$, or the like, and a semiconductor of InP, Si, or the like. Also, in the optical modulator of the disclosure, the material of the optical waveguide substrate 1 is not particularly limited. However, substrates of dielectrics or semiconductors known in the related art can be used. In addition, even when forming an optical waveguide 2, it is possible to use known techniques such as a method of thermally diffusing Ti into a dielectric substrate of $LiNbO_3$ and forming an optical waveguide or forming a ridge type optical waveguide.

In an optical waveguide substrate 1, a control electrode is formed along the optical waveguide 2. For the control electrode, a modulation electrode to which a modulation signal using a high frequency signal is inputted and a DC bias electrode for bias control are formed. For the control electrode, a pattern of a base electrode is formed on the optical waveguide substrate 1, and then an electrode with a thickness of several tens of μm is formed using Au by a plating method.

The configuration of the optical waveguide is a so-called nested optical waveguide in which one Mach-Zehnder type optical waveguide and two Mach-Zehnder type optical waveguides are disposed in a nested form. In addition, like a DP-QPSK optical modulator shown in FIG. 1, various optical waveguide forms such as a form in which two nested optical waveguides are disposed can be used. FIG. 1 shows an example of the optical modulator, and when light waves input through an input optical fiber 20 propagate the optical waveguide 2, it is subjected to light modulation by the control electrode (not shown). Light waves emitted from the optical waveguide substrate 1 are combined with a polarization beam by a polarization beam combining unit 8 and enters an output optical fiber 21.

In addition, regarding the number of signal electrodes that apply input electrical signals to a modulation part of the optical waveguide, as shown in FIG. 1, the disclosure is not limited to a DP-QPSK optical modulator including four signal electrodes. The disclosure can be applied to various types such as a single type (one signal electrode for modulation), a dual type (two signal electrodes for modulation), and a DQPSK configuration modulator (two signal electrodes for modulation). In particular, as the number of signal electrodes increases, the disclosure can be more effectively applied. For example, the disclosure can be particularly effectively applied to a multi-element configuration in which two DP-QPSK optical modulators are incorporated and 8 input electrical signals are included.

The relay substrates 3 and 30 and the terminal substrate 7 are disposed in the vicinity of the optical waveguide substrate 1. Since a material used for the relay substrates 3, 30 and the terminal substrate 7 is used at a high frequency in a microwave band or the like, ceramic materials such as alumina superior to high frequency characteristics and the like are frequently used. In a modulation electrode (not shown) of the optical waveguide substrate 1, electrical wirings for relaying modulation signals inputted from an input connector 4 and an electrical wiring for relaying a DC bias voltage inputted from a part of input/output pins 40 are formed on the relay substrates 3 and 30. In addition, when a light receiving element configured to receive light waves that propagate through the optical waveguide substrate 1 is provided, a part of the electrical wirings of the relay substrate 30 and another part of the input/output pins 40 can be used in order to guide a light reception signal from the light receiving element to the outside.

A gap between the input/output pin 40 and the electrical wirings on the relay substrate 30, a gap between the electrical wirings of the relay substrates 3 and 30 and the input terminals of the control electrode of the optical waveguide substrate 1, and additionally, a gap between a terminal of the modulation electrode of the optical waveguide substrate 1 and the electrical wirings provided in the terminal substrate 7 are wire-bonded by an Au conductive wire 6 or the like.

According to a first aspect of the optical modulator of the disclosure, as shown in FIGS. 2 to 5, a heat dissipation auxiliary element is provided in the terminal substrate 7. As the heat dissipation auxiliary element 10 (or 11~13), an element that connects the terminal substrate 7 and the housing 9 and increases the thermal conductivity can be used. Specifically, a metal foil (the reference numeral 10 in FIG. 2), a bonding wire using an Au wire or the like (the reference numeral 11 in FIG. 3), and a thermally conductive adhesive such as a silicone type containing a filler (the reference numeral 12 in FIG. 4) can be used.

When a metal foil 10 is used for the heat dissipation auxiliary element, the steps of processes in assembling the optical modulator are increased, but the heat generated on the surface of the terminal substrate 7 can be conducted and dissipated using the large area of metal, and a metal foil can be suitably used for terminal resistors 70 generating a large amount of heat and for terminal resistors 70 with a smaller design.

When wire bonding 11 are used for the heat dissipation auxiliary element, although the heat dissipation efficiency slightly decreases, automatic assembly is possible and the steps of assembling processes are few, and it is possible to provide a higher degree of freedom in a terminal heat dissipation auxiliary element.

When a thermally conductive adhesive 12 is used for the heat dissipation auxiliary element, this is a configuration example having a high heat dissipation efficiency because it is possible to conduct and dissipate heat generated according to its volume. Therefore, this thermally conductive adhesive can be suitably used for terminal resistors 70 generating a large amount of heat and for terminal resistors 70 with a smaller design.

In addition, this configuration using the thermally conductive adhesive 12 can be implemented according to the above configuration in which the metal foil 10 or wire bonding 11 is provided, and this is an example having a high degree of freedom because it can also be implemented according to an actual heat generation situation after the design thereof is completed and a temperature environment in which the optical modulator is placed.

In addition, this configuration can be suitably used, for example, when it is difficult to implement the wire bonding or provide the metal foil due to the terminal resistors 70, the internal design of the housing 9, and the like.

Figure 5:
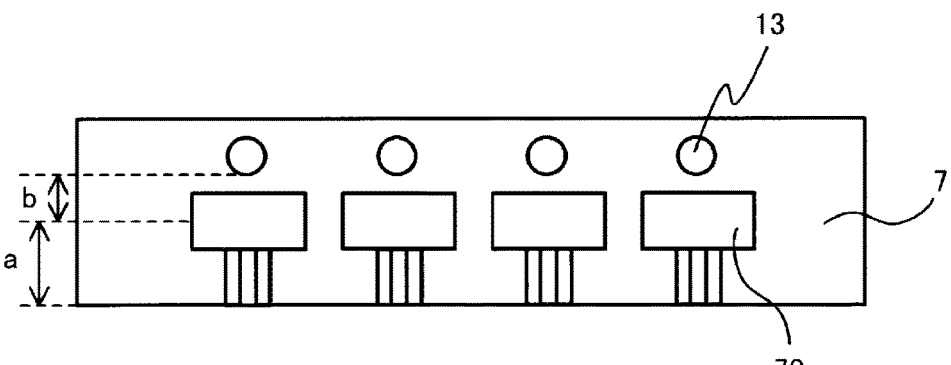
FIG. 5 is a plan view showing the fourth embodiment of the optical modulator according to the disclosure.

In addition, as shown in FIG. 5, as another heat dissipation auxiliary element, vias 13 that penetrate through the terminal substrate 7 can be used. When the vias are used, heat on the surface of the terminal substrate 7 is transferred to the back surface of the terminal substrate 7 through the vias, and additionally is released into the housing 9 that supports the terminal substrate 7. Therefore, with the vias 13, it is possible to implement measures for further increasing thermal conductivity, for example, by using metal vias having high thermal conductivity, and additionally, providing a metal film also on the back surface of the terminal substrate 7 at a position at which the vias 13 are formed.

Here, in FIGS. 2 to 5, while the heat dissipation auxiliary element 10 (or 11-13) is disposed on the upper side of the terminal resistors 70 (on the side opposite to the optical waveguide substrate 1), a configuration in which the heat dissipation auxiliary element 10 (or 11-13) is disposed on the left or right side (corresponding to the left or right in the drawing) of the terminal resistors 70 as necessary, and heat of the terminal substrate 7 is actively released into the housing 9 can be used. When the heat dissipation auxiliary element 10 (or 11-13) is disposed on the left or right side of the terminal resistors 70, preferably, a distance between the heat dissipation auxiliary element 10 (or 11-13) disposed on the left or right side and the terminal resistors 70 is made to be shorter than a distance from the terminal resistors 70 to an end on the side of the optical waveguide substrate 1 of the terminal substrate 7.

According to a second aspect of the optical modulator of the disclosure, a distance b between the terminal resistors 70 and the heat dissipation auxiliary elements 10 to 13 is set to be shorter than a distance a from the terminal resistors 70 to an end (a lower side of the terminal substrate 7 in the drawings) on the side of the optical waveguide substrate 1 of the terminal substrate 7.

In such a configuration, it is possible to conduct a larger amount of heat generated in the terminal resistors 70 toward the heat dissipation auxiliary element 10 (or 11-13), and it is possible to release heat into the housing 9 more efficiently. Thus, accordingly it is possible to reduce the amount of heat in the optical waveguide substrate 1.

According to a third aspect of the optical modulator of the disclosure, regarding the layout relationship between the terminal substrate 7 and the terminal resistors 70, as shown in FIG. 8, a distance b from the terminal resistors 70 to an end (upper side of the terminal substrate 7 in the drawing) on the side opposite to the optical waveguide substrate 1 (not shown) of the terminal substrate 7 is set to be shorter than a distance a from the terminal resistors 70 to an end (lower side of the terminal substrate 7 in the drawing) on the side of the optical waveguide substrate 1 of the terminal substrate 7. In such a configuration, it is possible to more actively promote an action of heat dissipation to the housing 9 to which the terminal substrate 7 is fixed. Here, in order to increase the efficiency of heat dissipation to the housing 9, it is possible to form a recess surrounding the terminal substrate 7 in the housing 9 so that the surface of the housing 9 is disposed in the vicinity of the terminal substrate 7. In addition, a configuration in which the terminal substrate 7 and the housing 9 are bonded together by a thermally conductive adhesive and the surface of the terminal substrate 7 and the surface of the housing 9 are bridged by a metal foil, bonding wires, or a thermally conductive adhesive can be used.

Figure 6:
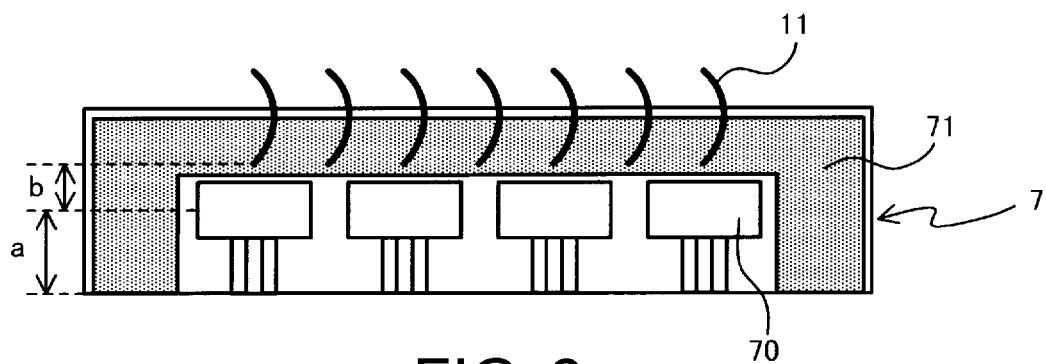
FIG. 6 is a plan view showing the fifth embodiment of the optical modulator according to the disclosure.
Figure 7:
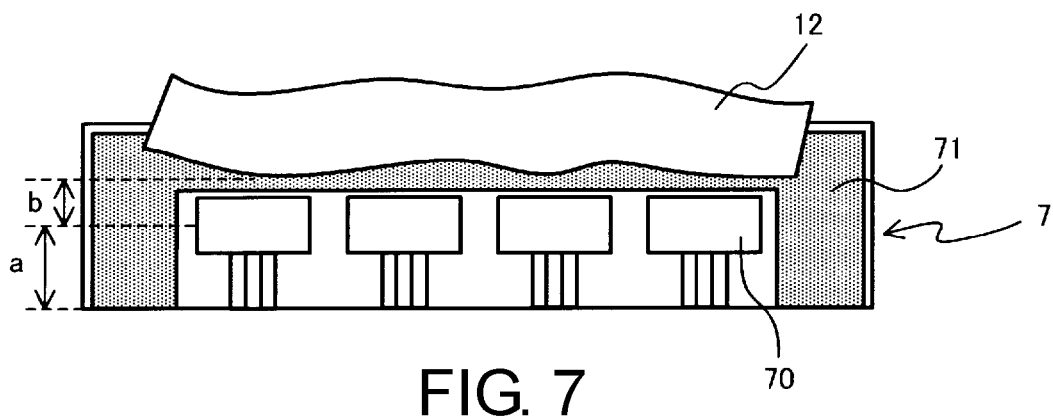
FIG. 7 is a diagram showing the sixth embodiment of the optical modulator according to the disclosure.
Figure 8:
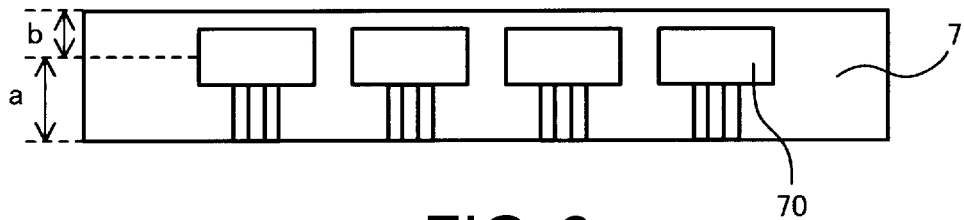
FIG. 8 is a diagram showing the seventh embodiment of the optical modulator according to the disclosure.

In order to accumulate heat generated by the terminal resistors 70 on the surface of the terminal substrate 7 and release it into the housing 9 efficiently, as shown in FIGS. 6 and 7, a good thermal conductor 71 such as a metal film can be disposed on the surface of the terminal substrate 7. As the good thermal conductor, an Au film, and particularly, an Au film formed to be thick by plating or the like, is suitably used. The good thermal conductor can be formed by extending a ground electrode (metal film) of the terminal resistors 70 over the entire surface of the terminal substrate 7. A place at which the good thermal conductor 71 is disposed is preferably at least on the side of the terminal resistors 70 opposite to the optical waveguide substrate 1, as necessary, as shown in FIGS. 6 and 7, and it can be disposed in a "U" shape to surround the terminal resistors 70.

In addition, in order to efficiently release heat accumulated in the good thermal conductor 71 into the housing 9, the above heat dissipation auxiliary element (such as element 10, 11, 12 or 13) can be provided on the good thermal conductor 71. In addition, preferably, a distance b between the heat dissipation auxiliary element and the terminal resistors 70 is set to be shorter than a distance a to an end on the side of the optical waveguide substrate 1 of the terminal substrate 7.

Figure 9:
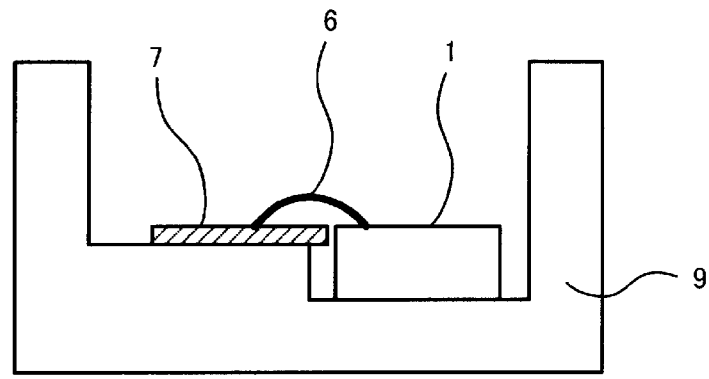
FIG. 9 is a cross-sectional view showing an example of the optical modulator.

As a method of increasing a heat dissipation effect of the terminal substrate 7 and reducing heat conduction to an optical waveguide substrate 1, as shown in FIG. 9, a configuration in which the thickness of the terminal substrate 7 is formed thinner than that of the optical waveguide substrate 1, and a step is formed between a first mounting surface of a housing 9 on which the terminal substrate 7 is mounted and a second mounting surface of the housing 9 on which the optical waveguide substrate 1 is mounted can be used.

Generally, since a ceramic material used for the terminal substrate 7 has lower thermal conductivity than a metal material, it efficiently transfers heat generated in the terminal substrate 7 to the outside of the terminal substrate 7. Therefore, when the terminal substrate 7 is thinned, it is possible to effectively apply the disclosure.

While the thickness of the thinned terminal substrate 7 needs to be selected in full consideration of a strength of a material used for the terminal substrate 7, the thermal conductivity, the size, and the like, and at least the optical waveguide 2 is formed and made thinner than the thickness (generally 0.5 mm to 2.0 mm) of chips (optical waveguide substrate 1) installed next to the terminal substrate 7. In consideration of dissipation of heat generated in the terminal resistors 70, the thinner is the better. However, in consideration of the mechanical strength, and the design of impedances of electrical lines to the control electrode and impedances of the terminal resistors 70, the range thereof may be set to 0.05 mm to 0.8 mm.

As shown in FIG. 9, an upper surface of the terminal substrate 7 on the housing 9, and a mounting surface of the optical waveguide substrate 1 are formed to have substantially the same height in order to prevent electrical signals from being deteriorated. When the thickness of the terminal substrate 7 is thinner, the thickness of the housing 9 under the terminal substrate 7 is formed thicker than the thickness of the housing 9 under the optical waveguide substrate 1, and a step is formed therebetween. As described in Patent Document 3, according to this step, it is possible to reduce heat conduction from the terminal substrate 7 to the optical waveguide substrate 1. In addition, when forming a groove (not shown) in the step part and a configuration in which a tip of the terminal substrate 7 protrudes from the step are combined, it is possible to further increase an effect of reducing heat conduction.

Figure 10:
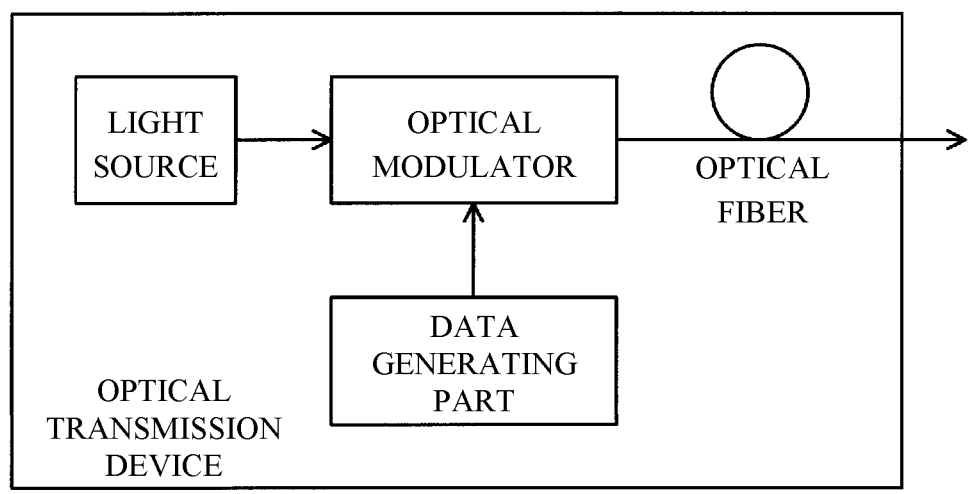
FIG. 10 is a diagram illustrating an example in which an optical modulator of the disclosure is incorporated into an optical transmission device.

FIG. 10 is a configuration example of an optical transmission device in which an optical modulator of the disclosure is mounted. A basic configuration of the optical transmission device includes a light source configured to generate a light wave that is introduced into an optical modulator, the optical modulator, a data generating part configured to apply signals to the optical modulator, and an optical fiber for guiding modulated light generated from the optical modulator to the outside.

When the optical transmission device starts to operate, the temperature of the optical modulator drifts. In order to stabilize transmission characteristics with high quality, it is necessary to perform an operation while an operation point of the optical modulator is controlled so that an appropriate state is maintained. This temperature drift is thought to be caused by heat generated in optical modulator peripheral components such as the light source and the data generating part in the related art.

However, in a DP-QPSK optical modulator, a small optical modulator, and the like, large temperature drift may occur immediately after the operation of the optical transmission device starts, and transmission characteristics of the optical transmission device may become very unstable. One reason for this is heat generated in the terminal resistors 70 inside the optical modulator itself. In particular, this phenomenon is particularly prominent in an optical modulator configuration in which a plurality of high frequency modulated signals is inputted, or when a plurality of terminal resistors 70 is formed in the same substrate, when amplitudes of input signals are large, and additionally, when the size of an optical modulator is reduced.

In order to address this problem, when an optical modulator to which the disclosure is applied is disposed in an optical transmission device, it is possible to efficiently release heat generated in the terminal resistors 70 to the housing 9 and reduce temperature drift, and it is possible to stabilize transmission characteristics with high quality.

The above examples are not limited to a configuration of the DP-QPSK optical modulator using a $LiNbO_3$ substrate. The disclosure can be applied regardless of modulation methods as long as the optical modulator includes terminal resistors and heat generated in the terminal resistors influences characteristics of the optical modulator. In addition, of course, the optical waveguide substrate may be made of a semiconductor material such as InP or Si, and even if a LiNbO$_3$ substrate is used, the disclosure can be applied regardless of a crystal orientation of Xcut, Zcut, or the like.

In addition, while a case in which only the terminal resistors are formed in the terminating unit has been described in the above examples, capacitors, other electronic parts, through conductors, and multi-layer electronic circuits may be incorporated into the same terminal substrate.

As described above, according to the disclosure, it is possible to provide an optical modulator with a reduced influence of heat generated in the terminal resistors and an optical transmission device using the same.

In view of the above, an optical modulator of the disclosure and an optical transmission device using the same are provided.

(1) The optical modulator includes an optical waveguide substrate where an optical waveguide is formed; a light modulation element that is provided in the optical waveguide substrate and includes a modulation electrode that applies an electric field corresponding to a modulation signal to the optical waveguide; a terminal substrate that is disposed in the vicinity of the light modulation element and includes terminal resistors that terminate the modulation signal, in which the optical waveguide substrate, the light modulation element and the terminal substrate are accommodated in a housing; and a heat dissipation auxiliary element is provided between the terminal resistor and the housing. A distance between the terminal resistors and the heat dissipation auxiliary unit is set to be shorter than a distance from the terminal resistors to an end on the side of the optical waveguide substrate of the terminal substrate, or a distance from the terminal resistors to an end on the side opposite to the optical waveguide substrate of the terminal substrate is set to be shorter than a distance from the terminal resistors to an end on the side of the optical waveguide substrate of the terminal substrate.

(2) In the optical modulator according to (1), a plurality of modulation electrodes is provided in the optical waveguide substrate and a plurality of terminal resistors is provided in the terminal substrate.

(3) In the optical modulator according to (1) or (2), the heat dissipation auxiliary element is any one of a metal foil, a bonding wire, and a thermally conductive adhesive, which connects the terminal substrate and the housing.

(4) In the optical modulator according to (1) or (2), the heat dissipation auxiliary element is a via that penetrates through the terminal substrate.

(5) In the optical modulator according to any one of (1) to (4), a metal film surrounding the terminal resistors is formed in the terminal substrate.

(6) In the optical modulator according to any one of (1) to (5), a thickness of the terminal substrate is formed to be thinner than that of the optical waveguide substrate, and a step is formed between a first mounting surface of the housing on which the terminal substrate is mounted and a second mounting surface of the housing on which the optical waveguide substrate is mounted.

(7) An optical transmission device is provided to include the optical modulator according to any one of (1) to (6); a data generating part, generating data signals that are applied to the optical modulator; and a light source, inputting light waves to the optical modulator.

According to the disclosure, the heat dissipation auxiliary element is provided between the terminal resistors and the housing, and a distance between the terminal resistors and the heat dissipation auxiliary element is set to be shorter than a distance from the terminal resistors to an end on the side of the optical waveguide substrate of the terminal substrate, or a distance from the terminal resistors to an end on the side opposite to the optical waveguide substrate of the terminal substrate is set to be shorter than a distance from the terminal resistors to an end on the side of the optical waveguide substrate of the terminal substrate. Therefore, it is possible to efficiently diffuse and release the heat generated in the terminal resistors to the housing. Accordingly, it is possible to reduce local heat generation in the terminal substrate and reduce an influence of heat generation on the optical waveguide substrate. In addition, a distance from the terminal resistors to the heat dissipation auxiliary element or an end on the side of the optical waveguide substrate of the terminal substrate is set to be shorter than a distance from the terminal resistors to an end on the side of the optical waveguide substrate of the terminal substrate. Therefore, the heat generated from the terminal resistors is conducted toward the housing more than to the optical waveguide substrate, and thus it is possible to efficiently reduce heat conduction to the optical waveguide substrate with a simple configuration.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical modulator, comprising:
an optical waveguide substrate, where an optical waveguide is formed;
a light modulation element, provided in the optical waveguide substrate and including a modulation electrode that applies an electric field corresponding to a modulation signal to the optical waveguide;
a terminal substrate, disposed in the vicinity of the light modulation element and including terminal resistors that terminate the modulation signal, wherein the optical waveguide substrate, the light modulation element and the terminal substrate are accommodated in a housing; and
a heat dissipation auxiliary element, provided in the terminal substrate on a side opposite to the optical waveguide substrate and between the terminal resistors and the housing,
wherein a distance between the terminal resistors and the heat dissipation auxiliary element is set to be shorter than a distance from the terminal resistors to an end on a side of the optical waveguide substrate of the terminal substrate, or
a distance from the terminal resistors to an end on a side opposite to the optical waveguide substrate of the terminal substrate is set to be shorter than a distance from the terminal resistors to an end on the side of the optical waveguide substrate of the terminal substrate.

2. The optical modulator according to claim 1, wherein a plurality of modulation electrodes is provided in the optical waveguide substrate and a plurality of terminal resistors is provided in the terminal substrate.

3. The optical modulator according to claim 1, wherein the heat dissipation auxiliary element is any one of a metal foil, a bonding wire, and a thermally conductive adhesive, which connects the terminal substrate and the housing.

4. The optical modulator according to claim 1,
wherein the heat dissipation auxiliary element is a via that penetrates through the terminal substrate.

5. The optical modulator according to claim 1,
wherein a metal film surrounding the terminal resistors is formed in the terminal substrate.

6. The optical modulator according to claim 1,
wherein a thickness of the terminal substrate is formed to be thinner than that of the optical waveguide substrate, and a step is formed between a first mounting surface of the housing on which the terminal substrate is mounted and a second mounting surface of the housing on which the optical waveguide substrate is mounted.

7. A optical transmission device, comprising:
the optical modulator according to claim 1,
a data generating part, generating data signals that are applied to the optical modulator; and
a light source, inputting light waves to the optical modulator.

8. The optical transmission device according to claim 7,
wherein a plurality of modulation electrodes is provided in the optical waveguide substrate and a plurality of terminal resistors is provided in the terminal substrate.

9. The optical transmission device according to claim 7,
wherein the heat dissipation auxiliary element is any one of a metal foil, a bonding wire, and a thermally conductive adhesive, which connects the terminal substrate and the housing.

10. The optical transmission device according to claim 7,
wherein the heat dissipation auxiliary element is a via that penetrates through the terminal substrate.

11. The optical transmission device according to claim 7,
wherein a metal film surrounding the terminal resistors is formed in the terminal substrate.

12. The optical transmission device according to claim 7,
wherein a thickness of the terminal substrate is formed to be thinner than that of the optical waveguide substrate, and a step is formed between a first mounting surface of the housing on which the terminal substrate is mounted and a second mounting surface of the housing on which the optical waveguide substrate is mounted.

* * * * *